United States Patent [19] [11] 4,448,132
Beatty [45] * May 15, 1984

[54] CONVERTIBLE RAILWAY-HIGHWAY VEHICLE

[76] Inventor: William T. Beatty, Rte. 2, Box 169-A, Tara Dr., Oakwood, Ga. 30566

[*] Notice: The portion of the term of this patent subsequent to Dec. 21, 1999 has been disclaimed.

[21] Appl. No.: 303,157

[22] Filed: Sep. 17, 1981

[51] Int. Cl.³ .................. B60F 1/00; B61D 15/00; B61F 13/00; B62D 61/12

[52] U.S. Cl. .................. 105/215 C; 105/159; 410/45; 410/53

[58] Field of Search .............. 105/215 C, 159; 410/45, 410/539

[56] References Cited

U.S. PATENT DOCUMENTS 1,938,049 12/1933 Serrano ........................... 105/215 C
2,030,311 2/1936 Messick .......................... 105/215 C
2,039,489 5/1936 Messick .......................... 105/215 C
3,875,870 4/1975 Beatty ............................ 105/215 C
4,316,418 2/1982 Hindin et al. ................... 105/215 C
4,364,315 12/1982 Beatty ........................... 105/215 C Primary Examiner—Robert B. Reeves
Assistant Examiner—Howard Beltran
Attorney, Agent, or Firm—B. J. Powell

[57] ABSTRACT

A convertible vehicle provided with a truck assembly adjacent the rear end and a plurality of liftable axle assemblies intermediate its ends. The truck assembly has railway wheels lowered for railway use and highway wheels lowered for highway use. The liftable axle assemblies have highway wheels lowered during highway use. A lift mechanism raises the liftable axle assemblies during railway use and a locking mechanism releasably locks the liftable axle assemblies in the raised position. The front of the vehicle can be alternatively connected to a highway truck tractor or a railway truck.

6 Claims, 7 Drawing Figures

CONVERTIBLE RAILWAY-HIGHWAY VEHICLE

BACKGROUND OF THE INVENTION

This invention relates generally to vehicles and more particularly to vehicles convertible from railway to highway use.

Various proposals have been made for vehicles which can be converted between railway and highway use. These vehicles have attempted to use the same number of axles during highway use as during railway use to support the vehicle. Since the permissible axle loading during highway use is much less than the permissible axle loading during railway use, the maximum permissible load which could be carried in these prior art convertible vehicles was limited by the permissible axle loading for highway use. As a result, the number of prior art convertible vehicles required to carry a given payload was significantly increased as compared to the number of standard railway cars required to carry the same payload. This increased number of convertible vehicles served to increase the overall capital cost of such vehicles for a particular payload, increased the number of highway truck tractors required for highway transport and increased the operational costs associated with the use of such vehicles. Because of these problems, such prior art vehicles have not found widespread use.

SUMMARY OF THE INVENTION

These and other problems and disadvantages associated with prior art convertible vehicles are overcome by the invention disclosed herein by providing a vehicle convertible between railway and highway operation which has the same load carrying capacity in railway and highway operation. The vehicle has one end adapted to be alternatively supported by a highway truck tractor or a railway truck. The opposite end of the vehicle is provided with a convertible truck assembly which mounts a plurality of railway wheels and highway wheels thereon so that the railway wheels can be lowered and the highway wheels raised for railway use or the highway wheels lowered and the railway wheels raised for highway use. In addition, the vehicle is provided with a plurality of liftable axle assemblies intermediate the ends thereof provided with highway wheels which are lowered during highway use and raised during railway use. The liftable axle assemblies serve to reduce the loading on the highway wheels on the convertible truck assembly so the permissible loading on any one of the highway wheels is not exceeded during highway use. As a result, the convertible vehicle can be substituted for standard railroad cars on a one-to-one basis.

A lift mechanism is provided for simultaneously raising and lowering the highway wheels of all of the liftable axle assemblies. The lift mechanism is provided with a locking mechanism for selectively locking the highway wheels on the liftable axle assemblies in their raised positions to prevent inadvertent lowering of these highway wheels during railway use.

The convertible vehicle of the invention is adapted to be removably and alternatively coupled to a railway truck or a highway truck tractor adjacent one end with a convertible truck assembly adjacent its other end. The convertible truck assembly includes a plurality of railway wheels and a plurality of highway wheels with the railway wheels lowered for railway use and the highway wheels lowered for highway use. A plurality of liftable highway axle assemblies are connected to the vehicle intermediate its ends with a plurality of highway wheels adapted to be lowered during highway use so that the vehicle is supported by the highway wheels on both the convertible truck assembly and the liftable axle assemblies to prevent overloading of the highway wheels. A lift mechanism is provided and includes a drive assembly adapted to be moved along a linear path between a first position and a second position, a lift drive cylinder for selectively moving the drive assembly between these first and second positions, and a connection assembly interconnecting the drive assembly and each of said liftable highway axle assemblies so that the highway wheels thereon are in the lowered operative position when the driving assembly is moved to the first position and are raised out of said operative position as the driving assembly is moved to the second position. A locking mechanism is provided which includes a latch member selectively engaging the drive assembly to maintain the drive assembly in the second position, a latch engaging spring for constantly urging the latch member toward latching position to engage the drive assembly, and a latch release cylinder for selectively urging the latch member away from the latching position to a release position against the force of the latch engaging spring to release the drive assembly so that the drive assembly can be moved from the second position to the first position by the lift drive cylinder. A control arrangement is provided for delaying operation of the lift drive cylinder to move the drive assembly from the second position to the first position until the latch release cylinder has moved the latch member to the release position.

These and other features and advantages of the invention disclosed herein will become more fully understood upon consideration of the following description and accompanying drawings wherein like characters of reference designate corresponding parts throughout the several views and in which:

These figures and the following detailed description disclose specific embodiments of the invention; however, it is to be understood that the inventive concept is not limited thereto since it can be incorporated in other forms.

DETAILED DESCRIPTION OF ILLUSTRATIVE EMBODIMENTS

Figure 1:
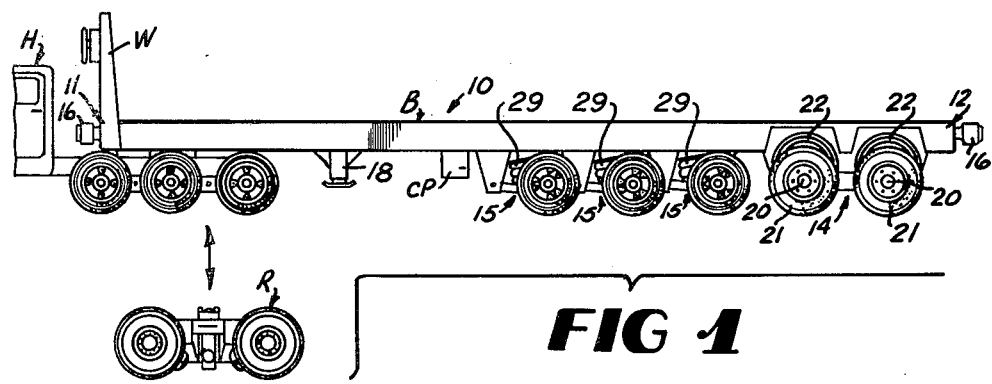
FIG. 1 is a side elevational view of a vehicle embodying the invention.

The convertible vehicle 10 embodying the invention is best seen in FIG. 1. The front end 11 of the vehicle is adapted to be alternatively connected to and supported by a highway truck tractor H during highway use or a railway truck R during railway use. The rear end 12 of the vehicle is mounted on a convertible truck assembly 14 which can be alternatively converted for railor highway use. A plurality of liftable axle assemblies 15 are mounted on the vehicle between the convertible truck assembly 14 and the position where the truck tractor H or railway truck R is connected to the vehicle. The liftable axle assemblies 15 are lowered during highway use and raised during railway use.

Figure 3:
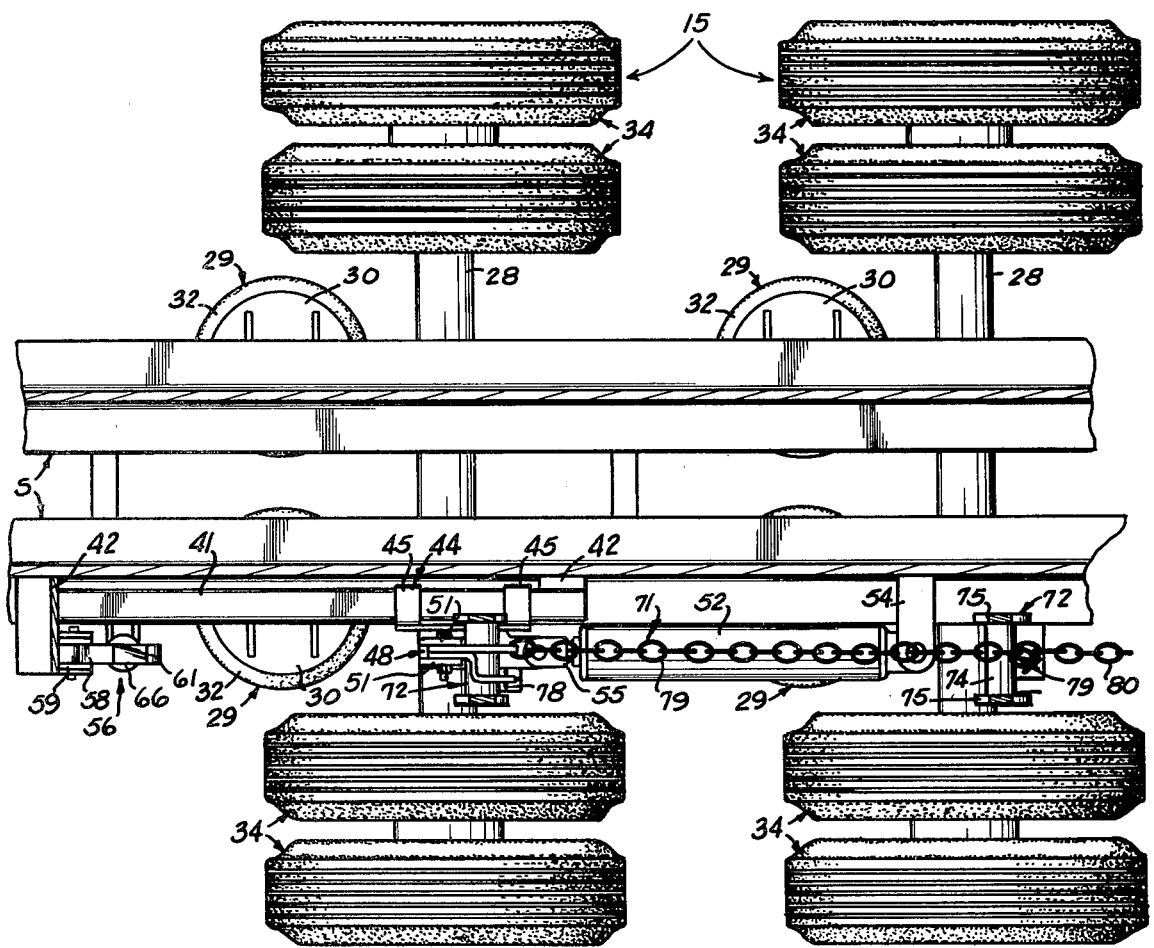
FIG. 3 is a cross-sectional view taken generally along line 3—3 in FIG. 2.

While the vehicle 10 may be of the open or closed type, it is illustrated in FIG. 1 as the open type with an open bed B provided with an upstanding abutment wall W at the front end 11 of the vehicle. The bed B is supported on a center sill assembly S seen in FIGS. 2 and 3 which extends along the length of the vehicle and serves as the frame to which the convertible truck assembly 14 and liftable axls assemblies 15 are mounted. The center sill assembly S is sufficiently strong to withstand the axial loading to which the vehicle is subjected during railway use. A conventional railway coupler 16 is provided on both ends of the vehicle 10 so that the vehicle 10 can be connected with other railway cars and locomotives. The center sill assembly S is provided, adjacent the front end 11 of the vehicle, with a king pin assembly (not shown) to be connected to the standard fifth wheel on the highway tractor H and a center plate assembly (not shown) to be connected to the railway truck R. A retractable landing gear 18 is mounted on the center sill assembly S between the liftable axle assemblies 15 and the front end of the vehicle which is lowered to support the front end 11 of the vehicle while the truck tractor H and railway truck R are being interchanged.

The convertible truck assembly 14 is of the type disclosed in my earlier U.S. Pat. No. 3,875,870. Truck assembly 14 includes a pair of spaced apart axles 20. Each of the axles 20 is equipped with an offset portion on opposite ends thereof on which is rotatably mounted a highway wheel and tire assembly 21. A railway wheel 22 is also rotatably mounted on opposite ends of the axle 20 just inboard of the offset portion so that the effective common axis of rotation of the wheel and tire assemblies 21 on opposite ends of axle 20 is laterally offset with respect to the common axis of rotation of the railway wheels 22 on opposite ends of axle 20. The axle 20 is rotatably mounted in the truck assembly 14 about the axis of rotation of the railway wheels 22 so that rotating the axle 20 serves to shift the wheel and tire assemblies 21 with respect to the railway wheels 22. Thus, the wheel and tire assemblies 21 can be lowered below the railway wheels 22 into ground engaging contact as seen in FIG. 1 to support the vehicle 10 on the wheel and tire assemblies 21 or raised above the railway wheels 22 to support the vehicle on the railway wheels 22. An appropriate hydraulic driving mechanism is provided for selectively rotating the axles 20 to raise and lower the wheel and tire assemblies 21.

The liftable axle assemblies 15 are mounted on the center sill assembly S forwardly of the convertible truck assemnbly 14 at longitudinally spaced apart positions. All of the liftable axle assemblies 15 have the same construction. Each of the liftable axle assemblies 15 includes a pair of support beams 25 attached to the underside of the center sill assembly S so that the beams 25 are in registration with each other laterally of the vehicle longitudinal axis. A pair of torque arms 26 are provided, each of which is pivoted at its forward end to one of the support means 25 so that both of the torque arms are pivoted to the support beams 25 about a common horizontal pivot axis normal to the longituding axis of the vehicle 10. The torque arms 26 project rearwardly of the support beams 25 and mount an axle 28 therebetween on the rearwardly projecting ends thereof so that axle 28 is also oriented normal to the longitudinal axis of the vehicle. Thus, it will be seen that the axle 28 can be raised and lowered as the torque arms 26 pivot about their common pivot axis at the support beams 25. A pair of air bag spring assemblies 29 are provided to spring the liftable axle assembly 15. Each air bag spring assembly 29 is connected between the center sill assembly S and one of the torque arms 26 between the axle 28 and the support beam 25. Spring assembly 29 includes a fixed seat assembly 30 mounted on the underside of the center sill assembly S above the torque arm 26 and a liftable seat assembly 31 mounted on torque arm 26 therebelow with an air bag 32 extending therebetween. When the air bags 32 of both of the spring assemblies 29 are inflated, it will be seen that they spring axle 28. A pair of dual wheel and tire assemblies 34 are rotatably mounted on opposite ends of the axle 28 outboard of the center sill assembly S so that the tires 35 thereon are lowered into road engaging contact when the axle 28 is lowered as shown in the figures and are raised out of road engaging contact when the axle 28 is raised as indicated by phantom lines in FIG. 2. Appropriate brakes (not shown) are provided to brake the wheel and tire assemblies 34 and an appropriate alignment mechanism may be provided to limit the side-to-side movement of the wheel and tire assemblies 34 during side loading.

A lift mechanism 40 seen in FIGS. 2–5 is provided for selectively raising and lowering all of the liftable axle assemblies 15. The lift mechanism 40 includes a horizontally oriented guide tube 41 mounted on one side of the center sill assembly S by support brackets 42 so that guide tube 41 is spaced from the center sill assembly S and also oriented parallel to the longitudinal axis of the vehicle. The guide tube 41 is located over the forwardmost liftable axle assembly 15 as will become more apparent and has a square cross-sectional shape. A slide assembly 44 is slidably mounted on the guide tube 41 between brackets 42 for slidable movement along the length thereof. The slide assembly 44 includes a pair of spaced apart collars 45 joined by a support plate 46 with the collars 45 encircling the guide tube 41 to slidably support the slide assembly 44 thereon.

A drive assembly 48 is mounted on the support plate 46 for movement with slide assembly 44 and projects laterally outward therefrom outboard of the center sill assembly. The drive assembly 48 includes a horizontally oriented base plate 49 fixedly attached to the supper plate 46. The rear end of the base plate 49 is provided with an eye section 50 as will become more apparent. A pair of spaced apart, upstanding drive plates 51 are mounted on top of the base plate 49.

A fluid cylinder 52 is provided for moving the drive assembly 48 and slide assembly 44 axially along the guide tube 41. The fluid cylinder 52 is located rearwardly of the drive assembly 48 so that it is coaxially aligned with the path of movement of the drive assembly 48. The closed rear end of cylinder 52 is pivotally mounted on support ears 54 attached to the side of the center sill assembly S to pivot about a vertical axis. The piston rod 55 projects forwardly of cylinder 52 and is pinned at its projecting end to the eye section 50 on drive assembly 48 so that, as piston rod 55 is extended, the drive assembly 48 and slide assembly 44 are moved forwardly along the guide tube 41 from the retracted position seen in solid lines in FIG. 2 to the extended position shown in phantom lines in FIG. 2.

A locking mechanism 56 is provided at the extended position of the drive assembly 48 to keep the drive assembly 48 in its extended position. The locking mechanism 56 includes a latch member 58 pivotally mounted about a horizontal axis in a pivot bracket 59 mounted on the front support bracket 42. The latch member 58 projects rearwardly of bracket 59 and is provided with a notch 60 in its upper edge to define a forwardly facing latch shoulder 61 in latch member 58. The latch member 58 is located in alignment with the path of movement of the drive assembly 48 so that the base plate 49 overlies the latch member 58 when the drive assembly 48 is in its extended position.

A catch member 62 is attached to the bottom of the base plate 49 to engage the latch member 58 when the drive assembly 48 is in its extended position. The catch member 62 projects below base plate 49 in alignment with latch member 58 and is provided with a forwardly facing camming surface 64 to engage the rearwardly projecting end of latch member 58 as the cylinder 52 moves the drive assembly 48 forwardly to its extended position and pivot the latch member 58 downwardly as will become more apparent. The catch member 62 is provided with a rearwardly facing catch surface 65 adapted to engage the latch shoulder 61 when the catch member 62 lies in the notch 60 to keep the drive assembly 48 in its extended position as will become more apparent.

The latch member 58 is positioned by a latch cylinder 66 mounted on the support beam 25 of the forwardmost lift axle assembly 15 below latch member 58. The piston rod 68 of cylinder 66 projects upwardly from the latch cylinder 66 and is pinned to the latch member 58. Thus, as the piston rod 68 is extended, the latch member 58 is pivoted upwardly to its latch position seen in FIG. 2 where the latch member 58 will engage the catch member 62 on the drive assembly 58 when the drive assembly 58 is in its extended position. When piston rod 68 is retracted, the latch member 58 is pivoted downwardly so that the catch member 62 is released to allow the drive assembly 48 to be moved toward its retracted position. The cylinder 66 is provided with an internal spring 69 shown by dashed lines in FIG. 2 that constantly urges the piston rod 68 toward its extended position. This, of course, constantly urges the latch member 58 upwardly toward its latch position. As the lift cylinder 52 moves the drive assembly 48 into its extended position, the camming surface 64 on catch member 62 will engage the rearwardly projecting end of the latch member 58 and pivot it downwardly against spring 69 so that the catch member 62 can pass over the end of latch member 58 and into the notch 60 therein. When the catch member 62 passes into the notch 60, the latch member 58 is released and spring 69 forces the latch member back up to its latch position so that the latch shoulder 61 will engage the catch surface 65 on catch member 62 to prevent retraction of the drive assembly 48 out of its extended position. Fluid under pressure is supplied to the rod end of cylinder 66 through connection 70 to retract piston rod 68 against spring 69 and thus lower the latch member 58 to release catch member 62 so that the drive assembly 48 can be retracted.

All of the liftable axle assemblies 15 are connected to the drive assembly 48 through a connection assembly 71 so that the wheel and tire assemblies 34 will be raised out of road engaging contact when the drive assembly 48 is moved to its extended position and will be lowered into road engaging contact when the drive assembly 48 is moved to its retracted position. The connection assembly 71 includes a plurality of guides 72 mounted on the bed frame above the liftable axle assemblies 15 with one of the guides 72 located above each axle 28. Each of the guides 72 includes a horizontally oriented cylindrical guide member 74 mounted between a pair of hanger plates 75 at opposite ends thereof. The hanger plates 75 project upwardly from the guide member 74 and are attached to the bed frame at their upper projecting ends.

Figure 2:
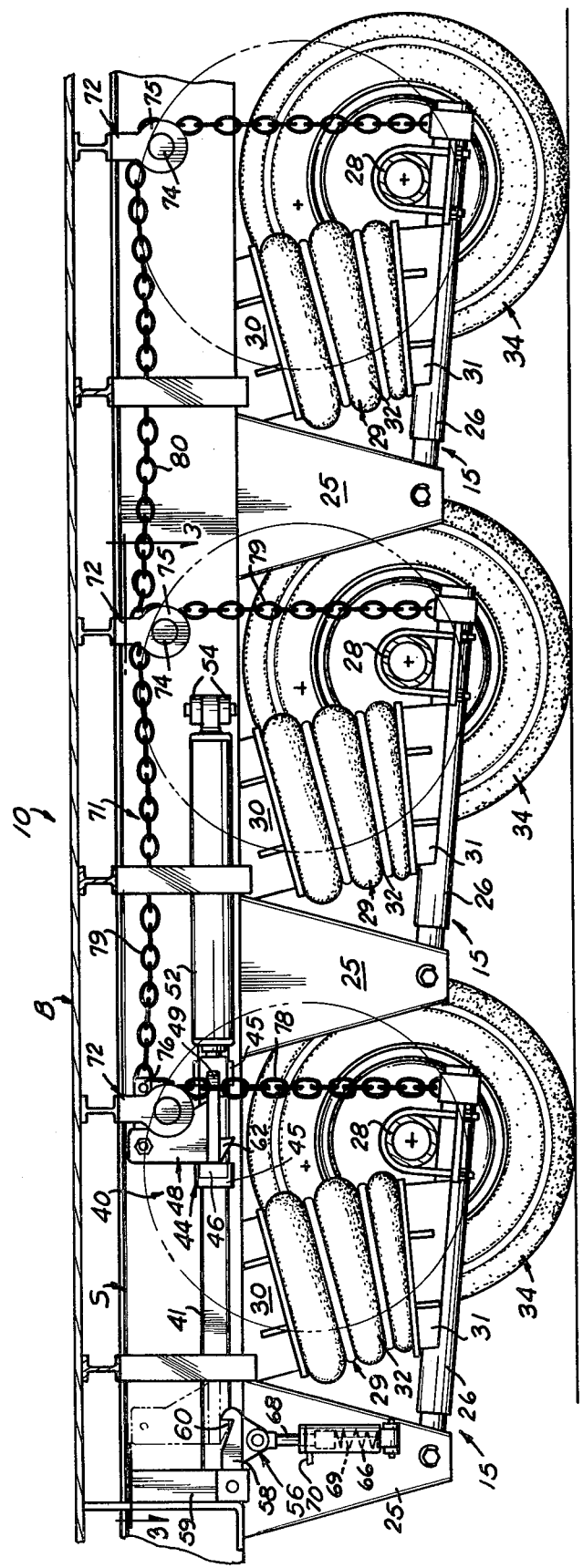
FIG. 2 is an enlarged longitudinal cross-sectional view through the liftable axle assemblies on the vehicle.
Figure 4:
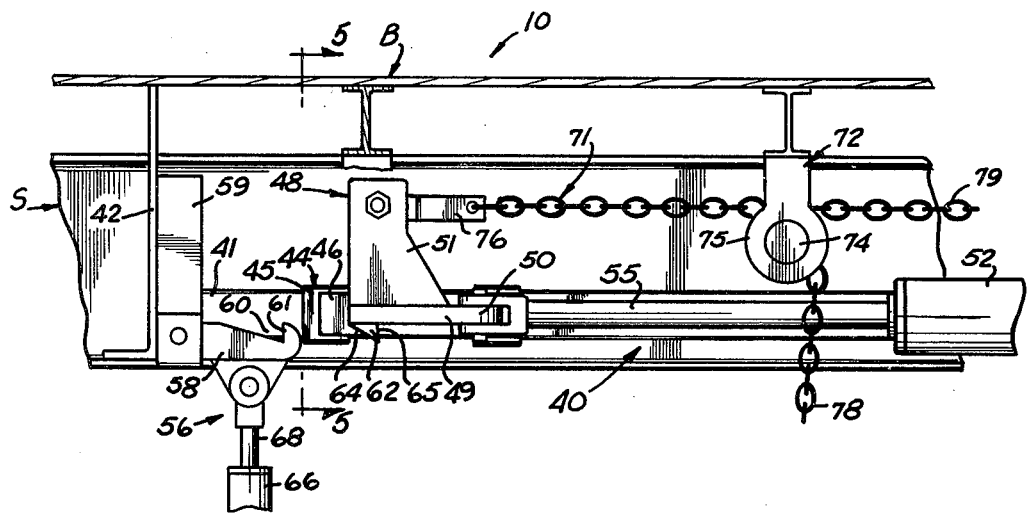
FIG. 4 is an enlarged portion of FIG. 2.
Figure 5:
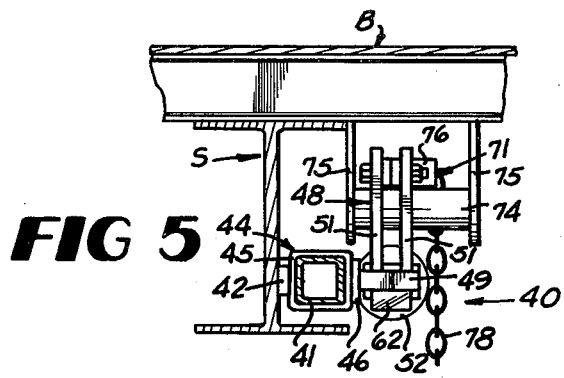
FIG. 5 is a cross-sectional view taken generally along line 5—5 in FIG. 4.

A clevis member 76 is pivotally connected between the upper ends of the drive plates 51 on the drive assembly 48 and projecting rearwardly of the drive plates 51. A link chain 78 connects the clevis member 76 with the rearwardly projecting end of torque arm 26 on the forwardmost liftable axle assembly 15 and extends over the guide 74 of guide 72 thereabove. A link chain 79 connects the clevis member 76 with the rearwardly projecting end of the torque arm 26 on the intermediate liftable axle assembly 15 and extends over the guide member 74 of guide 72 thereabove as well as over the guide member 74 of the guide 72 over the forwardmost liftable axle assembly. A link chain 80 connects the link chain 79 intermediate its ends with the torque arm 26 on the rearmost liftable axle assembly 15 and extends over the guide 74 of guide 72 above the rearmost axle assembly 15 as well as over the guide member 74 of guide 72 above the intermediate axle assembly 15. The lengths of chains 78–80 are such that, when the drive assembly 48 is in its retracted position as seen in FIG. 2, the wheel and tire assemblies 34 are lowered into road engaging contact with the road surface. As the drive assembly 48 is moved forwardly toward its extended position by the lift cylinder 52, the lift chains 78–80 will be pulled up and over the guides 72 to raise the axles 28 and move the wheel and tire assemblies 34 thereon up out of road engaging contact to the raised positions shown by phantom lines in FIG. 2. When the locking mechanism 56 engages and holds the drive assembly 48 in its extended position, the wheel and tire assemblies 34 will be locked in their raised positions until the drive assembly 48 is released. It will be appreciated that the chains 78–80 have enough slack in them when the wheel and tire assemblies 34 are lowered so as not to interfere with the normal operation thereof. The hanger plates 75 also serve to keep the chains 78–80 on the guide members 74.

Figure 6:
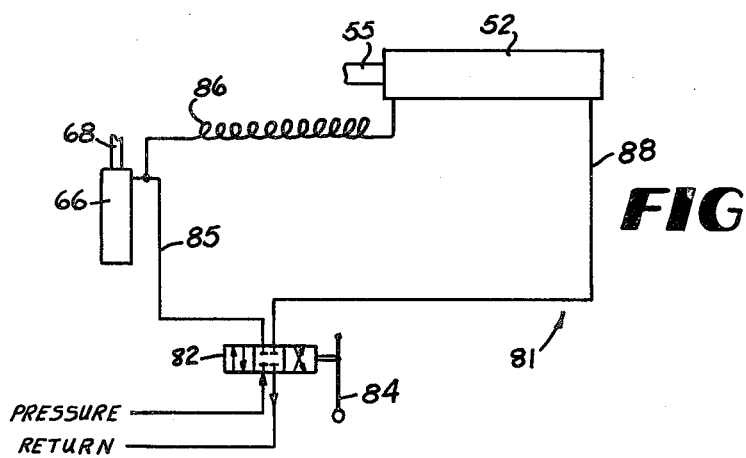
FIG. 6 is a fluid schematic for controlling the operation of the invention.

It will be appreciated that the latch member 58 needs to be retracted to its release position before the drive assembly 48 is moved from its extended position and that the latch member 58 needs to be urged toward its latch position as the drive assembly 48 is moved toward its extended position. In other words, the latch cylinder 66 needs to be retracted before the lift cylinder 52 is retracted and the fluid pressure needs to be removed from latch cylinder 66 while cylinder 52 is being extended. The fluid circuit 81 seen in FIG. 6 performs this function. The operation of cylinders 52 and 66 are controlled by a manually operated three position control valve 82 with an operating handle 84. One of the outlets of valve 82 is connected to the rod end of cylinder 66 by line 85. A line 86 connects line 85 adjacent cylinder 66 to the rod end of the lift cylinder 52 while the closed end of cylinder 52 is connected to the other outlet of valve 82 by line 88.

When valve 82 is transferred to retract cylinder 52, fluid under pressure is supplied to line 85 and will flow into cylinder 66 to retract its piston rod 68 and move the latch member 58 to its release position. Fluid will also flow through line 86 to cylinder 52. The length of line 86 is selected so that, by the time enough fluid has flowed through line 86 to cylinder 52 to start retracting cylinder 52, the cylinder 66 will already be fully retracted. This insures that latch member 58 will release the catch member 62 on drive assembly 48 before lift cylinder 52 starts to retract drive assembly 48 out of its extended position to prevent damage to the latch member 58 and catch member 62. When valve 82 is transferred to extend cylinder 52, the line 85 will be connected to the fluid return line so that the spring 69 in cylinder 66 will extend the piston rod 68 and raise latch member 58 to its latch position. This insures that the latch member 58 will always be in position to engage the catch member 62 and latch the drive assembly 48 in its extended position each time lift cylinder 52 is extended to raise the wheel and tire assemblies 34.

Figure 7:
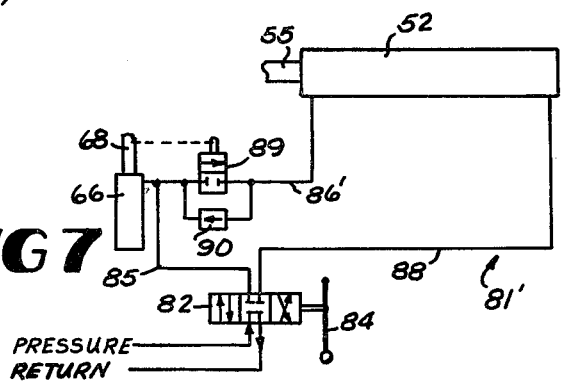
FIG. 7 is an alternative fluid schematic for controlling the operation of the invention.

FIG. 7 illustrates an alternate fluid circuit designated 81' to control the operation of the cylinders 52 and 66. Those components of circuit 81' common to circuit 81 have like reference numbers applied thereto. The difference between the circuits is that circuit 81' has a flow control valve 89 interposed in line 86' connecting line 85 with the rod end of cylinder 52 and a check valve 90 in parallel across valve 89. The check valve 90 allows fluid to flow from the rod end of cylinder 52 back to line 85 but prevents flow in the opposite direction. The activator on valve 89 is operatively connected to the piston rod 68 or latch member 58 so that valve 89 is transferred when piston rod 68 is retracted and the latch member 58 is in its release position to clear the catch member 62. This action supplies fluid to cylinder 52 to retract it. Thus, it will be seen that valve 89 blocks the flow of fluid to the rod end of the cylinder 52 until the latch member 58 releases the drive assembly 48. When valve 82 is transferred to extended cylinder 52, the fluid can flow out of the rod end of cylinder 52 through check valve 90 thus bypassing valve 89.

The operation of vehicle 10 will now be described starting with the front of vehicle 10 supported on the railway truck R for railway operation. In this mode, the wheel and tire assemblies 21 on the convertible truck assembly 14 will be raised so that the rear end of the vehicle is supported on the railway wheels 22 thereof. The wheel and tire assemblies 34 on the liftable axle assemblies 15 will also be raised and locked in their raised positions by the locking mechanism 56. To convert the vehicle 10 to highway operation, the retractable landing gear 18 is extended to lift the front end 11 of the vehicle 10 high enough to clear the railway truck R and the railway truck R rolled out from under the vehicle 10. The highway tractor H is backed under the front end of vehicle 10 so that the king pin assembly engages the fifth wheel assembly on the tractor H to connect vehicle 10 to the tractor. The tractor H is equipped with fluid pressure sources to operate the convertible truck assembly 14 and the liftable axle assemblies 15. Usually, the tractor H has a pneumatic pressure source to operate the braking systems for the highway wheel and tire assemblies 21 and 34 and a hydraulic pressure source for raising and lowering the wheel and tire assemblies 21 and 34. These fluid pressure sources are connected to the vehicle 10 through appropriate quick release connections.

This powers the fluid circuit 81 and the operator transfers control valve 82 which is located in a control panel CP on the side of vehicle 10 as seen in FIG. 1. This causes the latch member 58 in locking mechanism 56 to release the catch member 62 on the drive assembly 48 and the lift cylinder 52 to then move the drive assembly 48 to its retracted position to lower all of the wheel and tire assemblies 34 on the liftable axle assemblies 15 into ground engaging contact. An appropriate control (not shown) is provided to connect the pneumatic pressure source on the truck tractor H to the air bag spring assemblies 29 to charge same when the wheel and tire assemblies 34 are in contact with the road to provide the necessary spring action therefor.

The operator next operates an appropriate control in control panel CP to lower the wheel and tire assemblies 21 on the convertible truck assembly 14 into ground engaging contact which serves to lift the railway wheels 22 off of the railway tracks. By lowering the wheel and tire assemblies 21 on the convertible truck assembly 14 after the wheel and tire assemblies 34 in the liftable axle assemblies 15 have already been lowered and loaded, overloading of the wheel and tire assemblies 21 is prevented. When the landing gear 18 is retracted, the vehicle 10 is now ready for highway operation. To convert the vehicle back to railway use, the above procedure is reversed.

The number of liftable axle assemblies 15 used are sufficient to prevent overloading of the wheel and tire assemblies 21 and 34. A standard rail car typically has the capacity for carrying a payload of about 80,000 pounds. This payload carrying capacity can be accomplished using only four pairs of railway wheels. The permissible load carrying capacity of pneumatic wheel and tire assemblies for highway use is much less than railway wheels. Further, the dimensional restrictions of the convertible truck assembly 14 is such that only a single wheel and tire assembly 21 can be accommodated on each end of the axles 20. The maximum loading that can be reasonably accommodated by each pair of wheel and tire assemblies 21 on the convertible truck assembly 14 is about 9,000 pounds. The extra loading is absorbed by the wheel and tire assemblies 34 on the liftable axle assemblies 15 since the four wheel and tire assemblies 34 on each axle assembly 15 can carry about 12,000 pounds. Three liftable axle assemblies 15 are illustrated with the spacing between the axle assemblies 15 being such that the forwardmost axle assembly 15 being located in about the middle of vehicle 10 to reduce the loading on the highway tractor H. It will further be appreciated that, when the vehicle 10 is operated over the highway unloaded, the liftable axle assemblies 15 may be raised to reduce the wear on the wheel and tire assemblies 34 and permit shorter radius turns with the vehicle.

What is claimed as invention is:

1. A convertible highway-railway vehicle with one end adapted to be removably and alternatively coupled to a railway truck for railway use and a highway truck tractor for highway use, said vehicle including:

an elongate frame having opposed ends, said frame removably and alternatively coupled to the railway truck and the highway truck tractor adjacent one of said ends;

a convertible truck assembly operatively connected to said frame adjacent the other of said ends, said truck assembly including a plurality of railway wheels and a first plurality of highway wheels, said truck assembly adapted to lower said railway wheels into operative position for railway use while raising said highway wheels out of operative position and to lower said highway wheels into operative position for highway use while raising said railway wheels out of operative position; and a plurality of liftable highway axle assemblies operatively connected to said frame intermediate the ends thereof and including a second plurality of highway wheels adapted to be lowered into operative position during highway use so that the vehicle is supported by both said first and second plurality of highway wheels to prevent overloading said first plurality of highway wheels during highway use and to be raised out of operative position during railway use.

2. The convertible highway-railway vehicle of claim 1 further including lift means for selectively raising said second plurality of highway wheels out of operative position and locking means operatively associated with said lift means locking said second plurality of highway wheels in a raised position.

3. The convertible highway-railway vehicle of claim 2 wherein said lift means includes a drive assembly adapted to be moved along a linear path between a first position and a second position, lift drive means for selectively moving said drive assembly between said first and second positions, and connection means interconnecting said drive assembly and each of said liftable highway axle assemblies so that said second plurality of highway wheels are in the lowered operative position when said driving assembly is in said second position and are raised out of said operative position as said driving assembly is moved to said second position; and wherein said locking means includes a latch member selectively engaging said drive assembly to maintain said drive assembly in said second position, latch engaging means for constantly urging said latch member toward latching position to engage said drive assembly, and latch release means for selectively urging said latch member away from the latching position to a release position against the force of said latch engaging means to release said drive assembly so that said drive assembly can be moved from said second position to said first position by said lift drive means.

4. The convertible highway-railway vehicle of claim 3 further including means for delaying operation of said lift drive means to move said assembly from said second position to said first position until said latch release means has moved said latch member to the release position.

5. The convertible highway-railway vehicle of claim 4 wherein said lift means further includes an elongate guide member mounted on said frame and a slide assembly slidably mounted on said guide member for slidable movement along the length thereof, said slide assembly mounting said drive assembly thereon for movement therewith.

6. The convertible highway-railway vehicle of claim 5 wherein said guide member is horizontally oriented so that said drive assembly moves along a horizontal path; and wherein said connection means includes flexible inextensible member means connected to said drive assembly and having a separate portion thereof connected to each of said highway axle assemblies and a plurality of guide assemblies mounted on said frame so that one of said guide assemblies is located above each of said highway axle assemblies, each portion of said flexible inextensible member means connected to one of said highway axle assemblies trained over said guide assembly located thereabove so that said inextensible member means simultaneously raises and lowers said second plurality of highway wheels as said drive assembly is moved along the horizontal path.

* * * * *